(12) United States Patent
Griffin

(10) Patent No.: US 7,258,504 B2
(45) Date of Patent: Aug. 21, 2007

(54) LINK ASSEMBLY

(75) Inventor: Gary J. Griffin, Fraser, MI (US)

(73) Assignee: Edwards Industries, Inc., Royal Oak, MI (US)

( * ) Notice: Subject to any disclaimer, the term of this patent is extended or adjusted under 35 U.S.C. 154(b) by 143 days.

(21) Appl. No.: 10/812,907

(22) Filed: Mar. 31, 2004

(65) Prior Publication Data

US 2005/0220535 A1  Oct. 6, 2005

(51) Int. Cl.
*B62D 7/18* (2006.01)
(52) U.S. Cl. ............... 403/150; 403/365; 403/372; 280/93.512
(58) Field of Classification Search ........... 403/150, 403/151, 365, 372, 408.1; 384/125; 280/93.51, 280/93.511, 93.512; 411/903, 431, 377, 411/533, 542
See application file for complete search history.

(56) References Cited

U.S. PATENT DOCUMENTS

| | | | |
|---|---|---|---|
| 2,824,663 A * | 2/1958 | Fischer | 411/903 |
| 4,113,278 A * | 9/1978 | Rissberger | 280/124.106 |
| 4,533,277 A * | 8/1985 | Alexander et al. | 403/408.1 |
| 4,686,808 A * | 8/1987 | Triplett | 411/542 |
| 4,944,523 A * | 7/1990 | Hardy et al. | 280/124.152 |
| 5,449,193 A * | 9/1995 | Rivard et al. | 280/124.152 |
| 5,551,722 A * | 9/1996 | Schwartz et al. | 280/124.152 |
| 5,807,010 A * | 9/1998 | Parker et al. | 280/124.107 |

* cited by examiner

*Primary Examiner*—Daniel P. Stodola
*Assistant Examiner*—Michael P. Ferguson
(74) *Attorney, Agent, or Firm*—Steven, Davis, Miller & Mosher, LLP

(57) ABSTRACT

A link for connecting a pair of spaced members having a set of aligned holes, together, generally including a bolt having threaded end portions and a pair of upset portions based inwardly relative to the threaded end portions thereof, a pair of inner grommets each formed of a resilient material, mountable on the bolt and having a portion functional to snap-fit on one of the upset portions of the bolt when such grommet is mounted on the bolt, a pair of outer grommets each formed of a resilient material, mountable on the bolt and cooperable with one of the inner grommets to engage one of the members therebetween and a pair of nuts threadable on the threaded portions of the bolt, engageable with an exterior grommet mounted on the bolt.

27 Claims, 4 Drawing Sheets

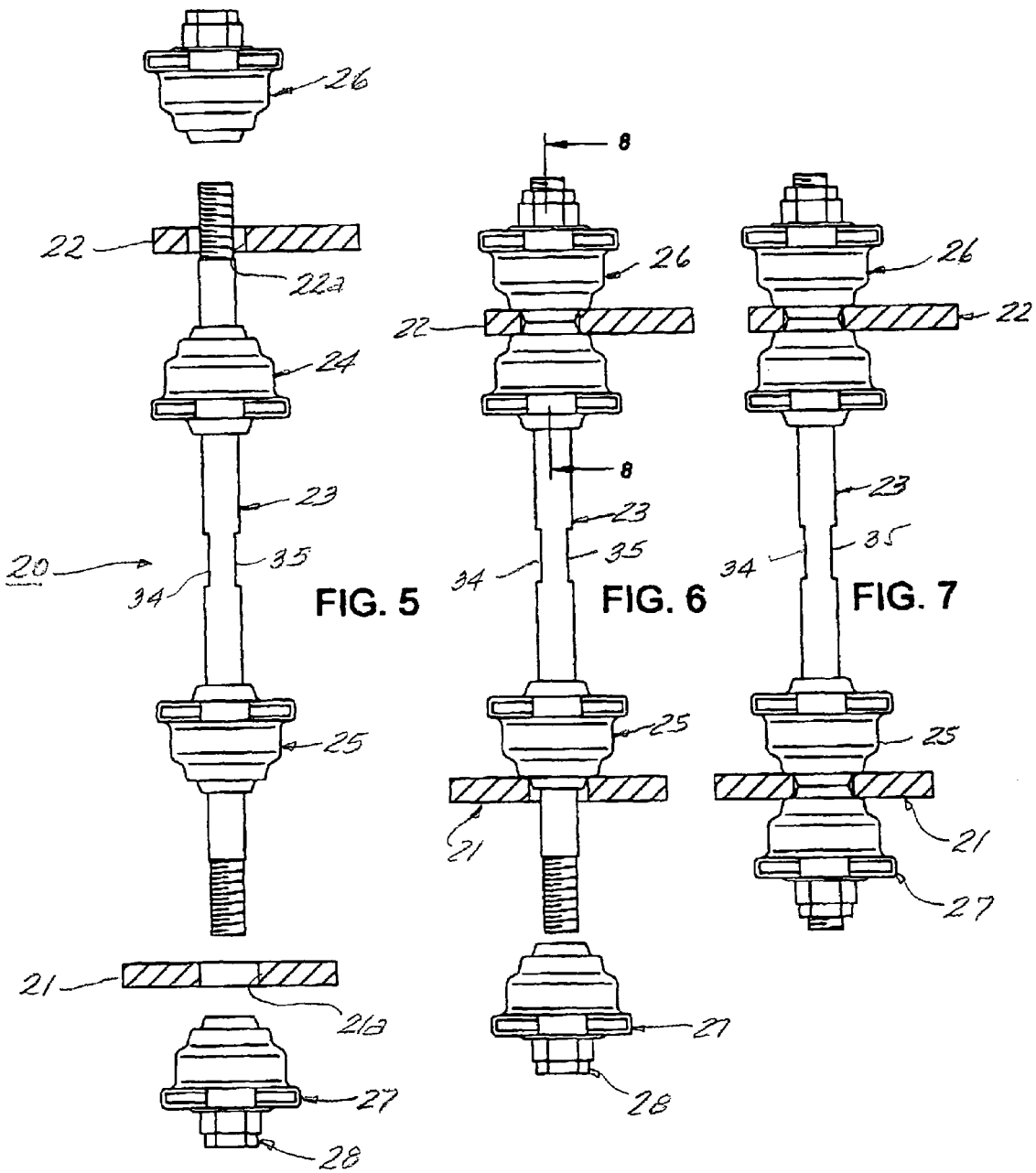

US 7,258,504 B2

LINK ASSEMBLY

This invention relates to a link assembly and more particularly to an assembly for connecting together a pair of spaced members such as a lower control arm and an end of a sway bar of a vehicle suspension system. The invention further contemplates a novel grommet suitable for use in such an assembly.

BACKGROUND OF THE INVENTION

In automotive vehicles having independent wheel suspension systems, there typically is provided a sway bar link that interconnects the lower control arm of the suspension system and an end of the sway bar. Typically, such links have consisted of an elongated bolt with end portions adapted to extend through a pair of aligned openings in the lower control arm and an end of the sway bar, a spool provided on the center portion of such bolt, a pair of resilient, inner grommets each mounted on the bolt between the spool and one of the members being connected, a pair of resilient, outer grommets each mountable on such bolt exteriorly of one of the members being connected and means provided on the ends of the bolt, usually a head portion of the bolt and a nut threaded on an opposite end of the bolt, for retaining the assembly together.

Usually, the components of such an assembly are produced by one or more vendors, shipped to an automotive manufacturer as loose components or a combination of loose components and partially assembled components and then installed by assemblers of vehicles being manufactured. In the past, it has been found that the supply of such assemblies by vendors to the automotive companies resulted not only in inefficiencies in the assembly of the various components but also in inefficiencies in the shipment of them. In the prior art, various improvements have been made in the design of such assemblies and the components thereof not only to reduce the number of components required but to assemble such components in a manner that facilitated both the handling in shipping and final installation of the assemblies. It further has been found, however, that such assemblies developed in the prior art are still too complicated in design, requiring an inordinate number of components, being cumbersome to assemble, package and ship and being unwieldy to install. Accordingly, it is the principal object of the present invention to provide a link assembly of the type described which is simple in design, comprises the least number of components, may be compactly assembled for shipment and may easily be handled to facilitate installation in the suspension system of a vehicle being manufactured. It further is an object of the present invention to provide a novel grommet adapted for use in such assemblies which is comparatively simple in design, comparatively inexpensive to manufacture and lends itself to efficient handling in shipping such assemblies from a vendor or vendors to an automotive manufacturer and installing such components in the suspension systems of vehicles.

SUMMARY OF THE INVENTION

The present invention provides an improved assembly for linking a pair of spaced members such as a lower control arm of a vehicle independent suspension system and an end of a sway bar, having a set of aligned holes, together, generally consisting of a bolt having threaded end portions and a pair of upset portions spaced inwardly relative to such threaded end portions, a pair of inner grommets each formed of a resilient material, mountable on such bolt and having a portion functional to snap-fit onto one of the upset portions of the bolt when the grommet is mounted on such bolt, a pair of outer grommets each formed of a resilient material, mountable on such bolt and cooperable with one of the inner grommets to engage one of the members being connected therebetween when an inner grommet is mounted on the bolt, an adjacent bolt portion is inserted through the hole of one of the members being connected and the other grommet is mounted on the end of the portion of such bolt extending through the hole of such member, and a pair of nuts each threaded onto a threaded portion of the bolt, engageable with an outer grommet mounted on such bolt. Preferably, each of such grommets is formed of a urethane material, is provided with an annular groove in a bore therethrough permitting such grommet to be snap-fit onto either an upset portion of such bolt or a flange portion of a nut mountable on a threaded end portion of such bolt, and includes a rigid washer insert molded in the body of the grommet, adjacent the annular groove therein to permit such washer to engage either an upset portion of such bolt or the flange portion of a nut, and having a center opening aligned with the bore in the grommet.

BRIEF DESCRIPTION OF THE DRAWINGS

FIGS. 5 through 7 are side elevational views of the embodiment shown in FIGS. 1 through 4, illustrating a sequence of stages of assembly of such link assembly by an assembler of an automotive company in installing such assembly in the wheel suspension system of a vehicle;

DETAILED DESCRIPTION OF EMBODIMENTS OF THE INVENTION

Figure 1:
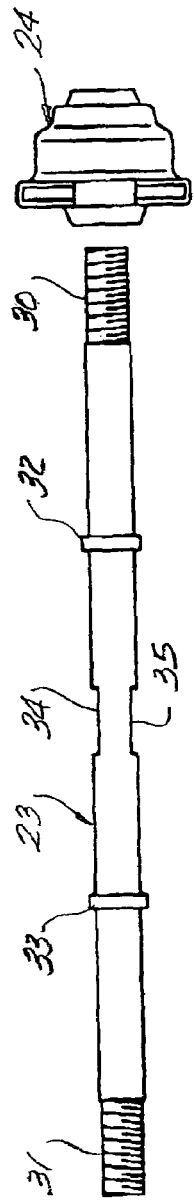
FIGS. 1 through 4 are side elevational views of a link assembly embodying the present invention, illustrating a sequence of different stages of assembly of the components thereof in preparing such assembly for shipment from a vendor to an automotive manufacturer.
Figure 2:
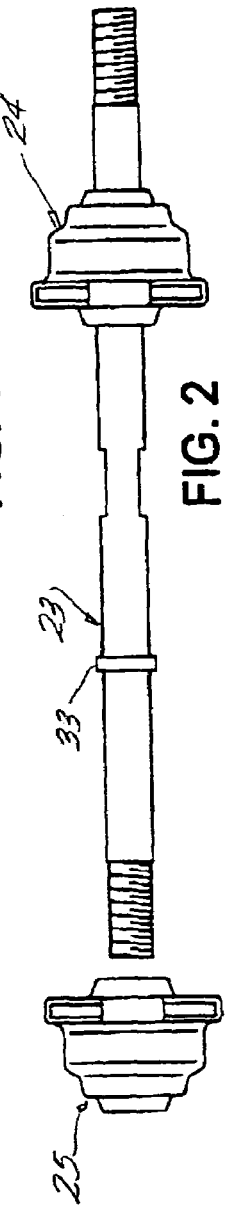
Figure 3:
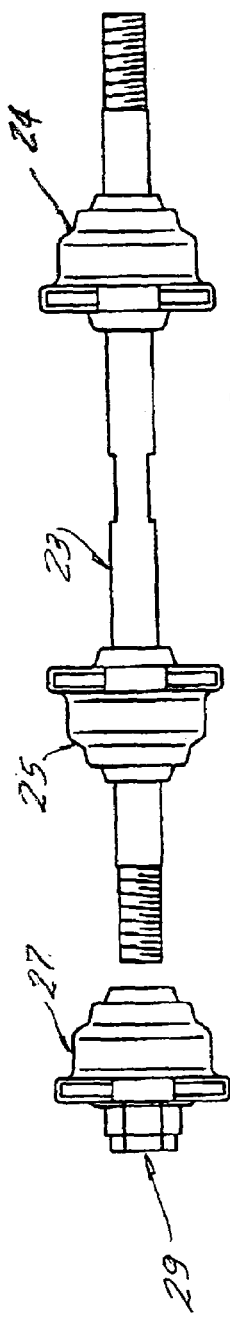
Figure 4:
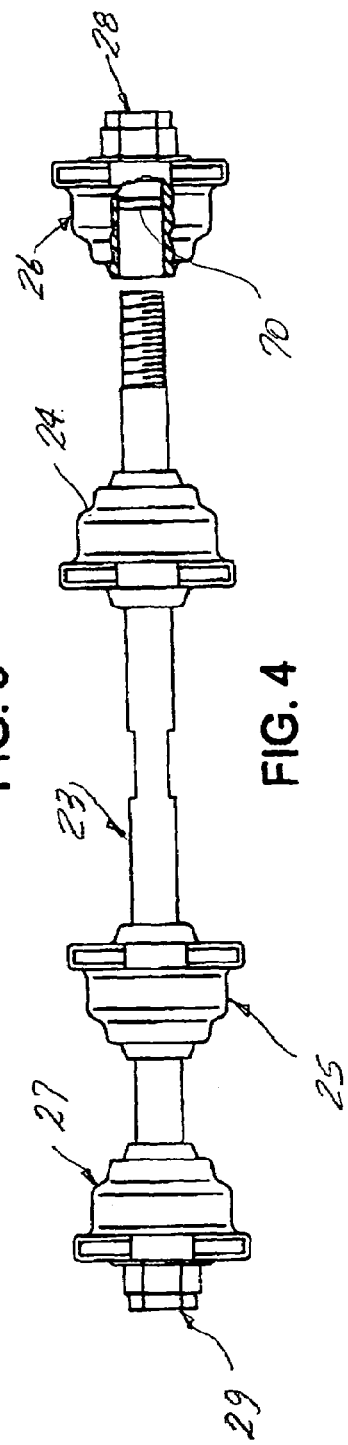

Referring to FIGS. 1 through 7 of the drawings, there is illustrated a link assembly 20 embodying the present invention which is adapted to be assembled as shown in FIGS. 1 through 4 by a vendor and shipped to an automotive manufacturer, and assembled by an assembler of an automotive manufacturer in the manner as shown in FIGS. 5 through 7 to connect a portion of a lower control arm 21 of an independent wheel suspension system, having an opening 21a, with a portion of an end of a sway bar 22 of the vehicle having an opening 22a which is adapted to the aligned substantially vertically with opening 21a. The assembly generally includes an elongated bolt 23, a pair of substantially identical inner grommets 24 and 25, a pair of substantially identical outer grommets 26 and 27 and a pair of substantially identical nuts 28 and 29. Bolt 23 is formed of a metal material, preferably steel, and includes a pair of threaded end portions 30 and 31, a pair of spaced, upset portions 32 and 33 each spaced from a threaded end portion of the bolt, having a substantially annular, rib configuration, and a pair of flat surfaces 34 and 35 disposed between upset portions 32 and 33 and substantially parallel to each other. Bolt 23 has a length sufficient to permit the ends thereof to be inserted through openings 21a and 22a of members 21 and 22 when the assembly is installed in a vehicle, and may be formed of a corrosive resistant metal or coated with a corrosion resistant material to resist deterioration in use in service.

Figure 9:
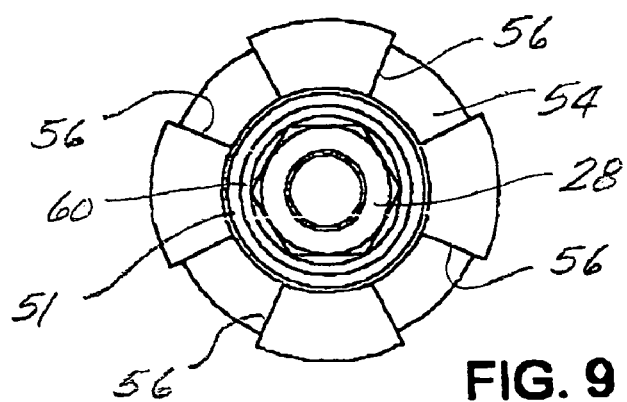
FIG. 9 is an end view of the assembly shown in FIG. 8.
Figure 8:
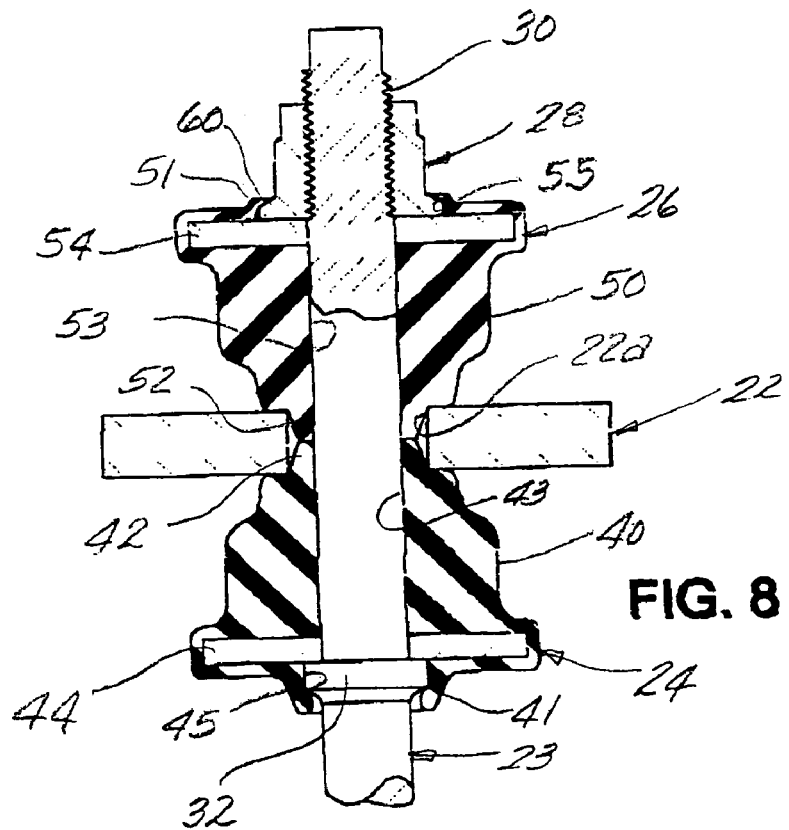
FIG. 8 is an enlarged, cross-sectional view taken along line 8-8 in FIG. 6.
Figure 10:
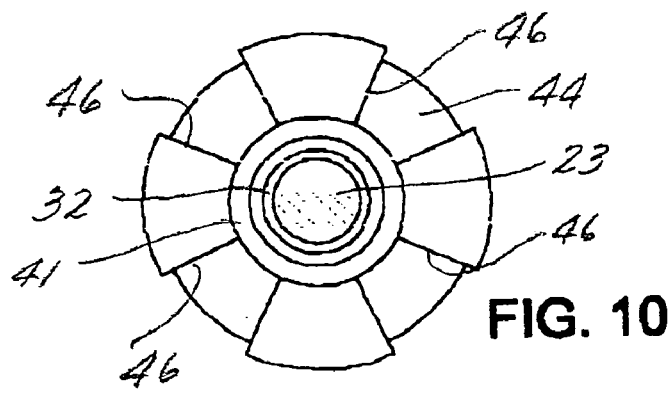
FIG. 10 is a view of the end of the assembly shown in FIG. 8 taken from an end of such assembly opposite the end shown in FIG. 9.

As best shown in FIGS. 8 through 10, inner grommet 24 is formed of a molded resilient material and includes a main body portion 40, a first hub portion 41, a second hub portion 42 and a bore 43 therethrough. Insert molded in the main body portion of grommet 24, adjacent hub portion 41 and disposed coaxially with bore 43 is a washer 44. Provided in the bore in hub portion 41 is an annular recess 45 which is adapted to allow grommet 24 to snap-fit on an upset portion of bolt 23 when the grommet is mounted on the end of the bolt with the end of the bolt extending through bore 43 as shown in FIG. 8. In the position as shown in FIG. 8, with grommet 24 snap-fit on upset portion 32 of the bolt, insert molded washer 44 will engage upset portion 32 to limit the inner travel of grommet 24 on bolt 23. Hub portion 42 of grommet 24 has an outer diameter less than the diameter of opening 22a to permit such hub portion to be received partially into opening 22a when the link assembly is fully assembled and installed as shown in FIG. 8. Preferably, the main body portion of grommet 24 is formed of a urethane material of a composition sufficient to provide the desired resiliency and resistance to deterioration over a service life subjected to repeated applied loads and the elements. Grommet 25 is similar in construction to grommet 24 and is adapted to be mounted on the opposite end of the bolt with the inner hub portion thereof adapted to snap-fit onto upset portion 33 of the bolt.

Grommet 26 is similar in construction and function to grommet 24 and includes a main body portion 50 having a hub portion 51, a hub portion 52 and a bore 53 for receiving an end portion of bolt 23 therethrough when grommet 26 is mounted on the end of the bolt as shown in FIG. 8, and a washer 54 insert molded in main body portion 50, adjacent hub portion 51. Bore 53 includes an annular groove 55 in the bore of hub portion 51 which is adapted to receive an annular flange portion 60 of nut 28. Prior to mounting grommet 26 on the end of bolt 23 as shown in FIG. 8, grommet 26 may be snap-fit on the flange portion of nut 28 so that grommet 26 snap-fit on nut 28 may be mounted on the end of the bolt as an integral unit by mounting the grommet on the end of the bolt and threading nut 28 on the threaded end of the bolt. Hub portion 52 also has an outside diameter less than the diameter of opening 22a to permit such portion to be partially received in opening 22a, engaging hub portion 42 of grommet 24 when grommets 24 and 26 are mounted on bolt 23 engaging member 22 therebetween as shown in FIG. 8. Washer 54 similarly is disposed adjacent hub portion 51 so that when grommet 26 is snap-fit on the flange of nut 28, the flange portion of nut 28 will engage washer 54.

As best shown in FIG. 9, an end of the main body portion of grommet 26 is provided with circumferentially spaced, radially extending cutout portions 71 exposing outer surfaces of washer 54. Similarly, as shown in FIG. 10, an end of the main body portion of grommet 24 is provided with circumferentially spaced, radially extending cutout portions 46 exposing portions of a face of washer 44. The purpose of such cutout portions is principally to facilitate the insert molding of the washers in the main body portions in the grommets and to a lesser extent to reduce the amount of resilient material used to mold the grommets.

Typically, the metallic components of the link assembly are produced by a metal parts manufacturer which supplies such parts to an injection molder which in turn produces the grommets with the washers insert molded therein, assembles the components in partially permanent and partially temporary conditions into a single assembly and then ships the single assemblies to the end user for installation into vehicles. More specifically, as best illustrated in FIGS. 1 through 4, the molder would first insert mold the washers in the main body portions of grommets 24 and 25, grommet 24 would be mounted on one end of bolt 23 and snap-fit on upset portion 32, grommet 25 would be mounted on the opposite end of the bolt and snap-fit on upset portion 33, grommet 26 would be snap-fit on the flange of nut 28 and then loosely mounted on one end of bolt 23 and grommet 27 would be snap-fit on the flange portion of nut 29 and loosely mounted on the opposite end of the bolt. To permit outer grommets 26 and 27 to be loosely, temporarily mounted on the ends of bolt 23, each of the bores of such grommets is provided with an annular, radially inwardly extending protrusion as best shown at 70 in FIG. 4. As each of such outer grommets is mounted on an end of the bolt, such protrusion formed of the same resilient material as the main body portion of the grommet will engage a threaded portion of the bolt and thus cause the outer grommet to be frictionally held on the end of the bolt. The inside diameter of the protrusion is slightly smaller than the diameter of the bore in the grommet so that the interference fit of the grommet on the end of the bolt will sufficiently secure the grommet on the end of the bolt for shipping purposes. With such components thus partially permanently and partially temporarily secured together, the assembly may be shipped as a single unit to the end user without the attendant risk of such components being separated and possibly lost.

Upon the link assembly being received by the end user, the assembly may be readily handled and installed in the suspension system of a vehicle by removing temporarily mounted outer grommets 26 and 27 from the ends of the bolt, extending the ends of the bolt through opening 21a of lower control arm 21 and opening 22a of end portion 22 of the sway bar, threading outer grommet 26 on the upper end of the bolt to secure the upper end of the bolt to the end portion of the sway bar with a pair of grommets each disposed between such end portion and the bolt, and then threading grommet 27 on the lower end of the bolt to connect the bolt to the lower control arm with a set of grommets each disposed between the bolt and the lower control arm, as shown in FIGS. 5 through 7. The intermediate portion of the bolt provided with parallel, flat surfaces 34 and 35 may be engaged by a wrench or gripped by pliers to facilitate the mounting of the outer grommets on the ends of the bolt in installing the assembly.

The snap-fit connections of the inner grommets on the upset portions of the bolt and the snap-fit connection of the outer grommets on the flange portions of the nuts are not intended as a means of transmitting loads through the grommets in absorbing the energy of such loads but merely to secure such grommets either permanently or temporarily on the bolts of such assemblies to facilitate shipping and installation of such assemblies. When fully assembled and operational, tensile and compressive loads applied to such assemblies are transmitted through suspension components 21 and 22 through the main body portions of the grommets and a washer or an annular flange portion of a nut to the bolt. Accordingly, the configurations of the upset portions of the bolt and the annular flange portions of the nuts along with the configurations of grooves 45 and 55 of the outer and inner grommets may be of any suitable shapes allowing the grommets to be snap-fit on the bolt and nuts as described. The configurations of the upset portions of the bolt, the flange portions of the nuts and grooves 45 and 55 of the grommets may all be of the same configuration or different configurations as long as such configurations permit the inner grommets to be snap-fit on the upset portions of the bolt and the outer grommets to be snap-fit on the flange portions of the nuts to further allow such components to be assembled, shipped and installed as described. Preferably, to reduce tooling cost in molding the grommets, a single grommet configuration may be provided for both the inner and outer grommets having a groove in the bore thereof provided with a configuration enabling it to be snap-fit on either an upset portion of the bolt or the annular flange portion of a nut and be secured thereon.

The main body portions of the grommets may be formed of any suitable resilient material although it is preferred that such bodies be injection molded with a urethane material. The metallic components of the assembly may be formed from either a corrosive resistant material or steel treated with corrosion resistant substances.

The link assembly as described provides an assembly which is not only simple in design, comparatively inexpensive to manufacture and highly effective in performance but convenient and easy to assemble, handle, ship and install.

Figures 11, 12:
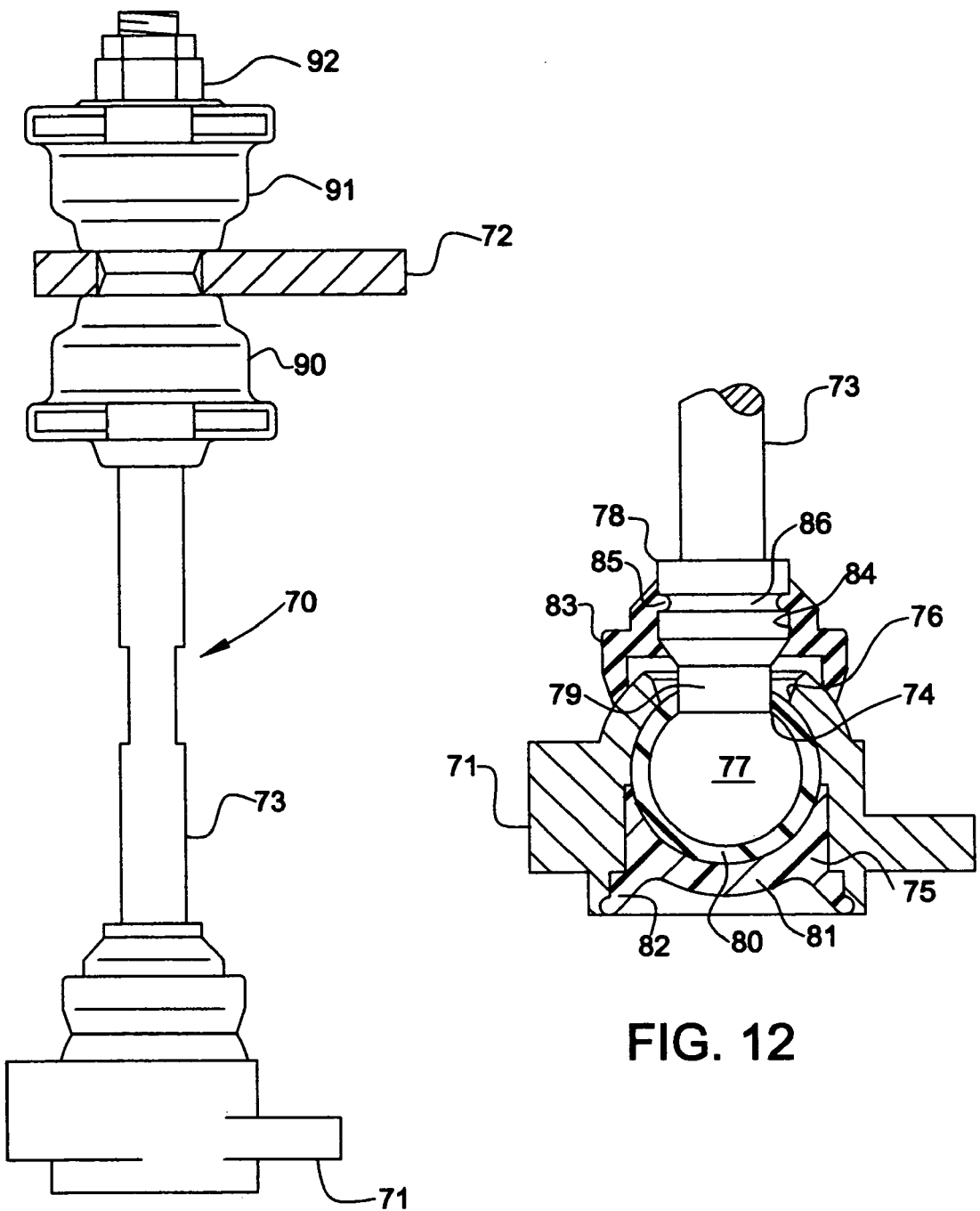
FIG. 11 is a side elevational view of another embodiment of the invention.
FIG. 12 is an enlarged, vertical cross-section of an end portion of the embodiment shown in FIG. 11.

FIGS. 11 and 12 illustrate another embodiment of the invention consisting of a link assembly 70 for connecting a lower arm member 71 to an upper arm member 72. Generally, the assembly consists of a bolt 73 connected at one end to a lower arm member 71 by means of a ball and socket connection and at an opposite end thereof by means of an assembly as shown in FIG. 8. As best shown in FIG. 12, the end portion of lower arm member 71 is formed with an opening 74 having an enlarged section 75 provided with an upper spherically configured wall portion merging into an annular wall portion. The upper end of opening 74 also is beveled as at 76. The one end of bolt 73 is formed with a spherical or ball portion 77 adapted to be received in the enlarged portion of opening 74, an enlarged annular portion 78 spaced from ball portion 77 and having a diameter no greater than the diameter of opening 74 to permit such annular portion to pass through opening 74 and an intermediate neck portion 79. Mounted on ball portion 77 is a spherical bushing 80 which is adapted to engage the spherical wall portion of enlarged section 75 of opening 74 when the ball portion of the bolt is received within enlarged section 75 as shown in FIG. 12. The ball portion of the bolt is retained in the enlarged section of opening 74 by means of a retainer 81 having an annular projecting portion 82 snap-fit into an annular recess provided in the annular wall portion of the enlarged section of opening 74.

The ball portion of bolt 73 is shielded from the exterior by means of a cup-shaped boot 83 provided with an opening 84 receiving a portion of the bolt therethrough, and having a portion engaging enlarged annular section 78 of the bolt and a lower portion engaging a raised portion of the lower arm member about opening 74. The boot is retained on bolt 73 and in engagement with the raised portion of the lower arm member by means of a radially, inwardly extending protrusion 85 received within an annular recess 86 formed in enlarged annular section 78 of the bolt. Boot 83 is formed of a resilient material so that it may be fitted onto the enlarged annular section of the bolt, engage the raised portion of the lower arm member and distort to allow the bolt member to displace angularly relative to an axis passing through the ball portion of the bolt. Due to the beveled portion 76 of opening 74, the bolt is capable of displacing angularly within a conical envelope defined by beveled surface 76 disposed radially relative to the center of the ball portion.

The opposite end of bolt 73 is adapted to extend through an opening in upper arm member 72 and includes a threaded end portion and an annular upset portion spaced from the threaded end portion comparable to upset portion 32 as shown in FIG. 8. The assembly connecting such end portion to upper arm member 72 further includes an inner grommet 90 comparable to grommet 24, an outer grommet 91 comparable to grommet 26 and a nut 92 comparable to nut 28. As in the previously described embodiments, inner grommet 90 is mounted on bolt 73 and snap-fit on the upset portion of the bolt with the inserted, metal washer thereof engaging the upset portion, outer grommet 91 is mounted on the bolt and nut 92 is threaded onto to the threaded end of the bolt into engagement with the metal washer of the outer grommet.

To install link assembly 70 to interconnect arm members 71 and 72, bushing 80 is first mounted on the ball portion of the bolt and the bolt is inserted through the lower end of opening 74 of the lower arm member so that the bushing engages the spherical wall portion of enlarged section 75. With the ball portion and bushing thus seated, retainer 81 is inserted into the enlarged section of opening 74 to secure the ball portion within the lower arm member. Boot 83 is then mounted on the bolt from the upper end thereof, slid down into engagement with the raised portion of the lower arm member to allow annular protuberance 85 to snap-fit into annular recess 86 thus shielding the ball portion of the bolt from the exterior. With the ball joint connection thus assembled, inner grommet 90 is slipped onto the free end of the bolt and snap-fit onto the upset portion of the bolt. The upper, free end of the bolt is then inserted through the opening of the upper arm member and outer grommet 91 is slipped onto the free end of the bolt into engagement with the upper control arm. The connection to the upper arm member is then completed by threading nut 92 onto the threaded end of the bolt. With such a connection, the bolt of the link assembly will be able to be displaced angularly relative to an axis passing through the center of the ball portion of the bolt within a conical envelope defined by the beveled portion of the opening in the lower control arm member, and tensile and compressive loads transferred between the bolt and the upper arm member will be absorbed by the resilient material of the inner and outer grommets.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

I claim:

1. A link for connecting a pair of spaced members having a set of aligned holes, together, comprising:
   a unitary bolt having threaded end portions and a pair of integrally formed, radially upset portions spaced inwardly relative to said threaded end portions;
   a pair of inner grommets each formed of a resilient material, mountable on said bolt and having a portion functional to snap-fit on one of said upset portions of said bolt when said grommet is mounted on said bolt, and each including a washer insert molded in said inner grommet and engageable with said upset portion of said bolt when said inner grommet is mounted on said bolt;
   a pair of outer grommets each formed of a resilient material, mountable on said bolt and cooperable with one of said inner grommets to engage one of said members therebetween when one said inner grommet is mounted on said bolt, an adjacent bolt portion is inserted through the hole of one of said members and said outer grommet is mounted on said end of a portion of said bolt extending through said hole; and a pair of nuts threadable on the threaded portions of said bolt, engageable with an outer grommet mounted on said bolt.

2. A link according to claim 1 wherein each of said inner grommets including said functional portion thereof includes a bore for receiving said bolt therethrough and said bore is provided with an annular groove at said functional portion thereof which receives said upset portion of said bolt when said inner grommet is mounted on said bolt and snap-fit on said upset portion.

3. A link according to claim 1 wherein said washer is disposed in a main body portion of said inner grommet adjacent said functional portion thereof.

4. A link according to claim 1 wherein said inner grommets are formed of a urethane material.

5. A link according to claim 1 wherein said inner grommet includes a hub portion receivable in said hole of said one member.

6. A link according to claim 1 wherein said outer grommets are formed of a urethane material.

7. A link according to claim 1 wherein each of said outer grommets includes a hub portion receivable in said one member when said outer grommet is mounted on said bolt.

8. A link according to claim 1 wherein each of said outer grommets includes a washer insert molded therein.

9. A link according to claim 8 wherein said washer is disposed within a main body portion of said outer grommet, positioned adjacent a nut threaded onto an end portion of said bolt when said link is fully assembled.

10. A link according to claim 1 wherein each of said nuts includes an annular flange and wherein each of said outer grommets includes a portion functional to snap-fit on the annular flange of one of said nuts.

11. A link according to claim 10 wherein each of said outer grommets including said functional portion thereof includes a bore for receiving said bolt therethrough and said bore is provided with an annular groove at said functional portion thereof which receives the flange portion of said nut when said outer grommet is snap-fit on said nut.

12. A link according to claim 10 wherein said outer grommet includes a washer insert molded therein.

13. A link according to claim 12 wherein said washer is disposed in a main body portion thereof adjacent said functional portion.

14. A link according to claim 13 wherein said washer is engageable by said nut when said link is in the assembled condition.

15. A link according to claim 10 wherein said outer grommets are formed of a urethane material.

16. A link according to claim 10 wherein each of said outer grommets includes a hub portion receivable in a hole of one of said members when such link is connected to said spaced members.

17. A link according to claim 1 wherein each of said outer grommets includes a bore for receiving said bolt therethrough, and the wall of said bore is provided with a protrusion engageable with said bolt extending through said bore, functional to permit said outer grommet to be temporarily frictionally held on an end of said bolt for shipping purposes.

18. A link according to claim 17 wherein said protrusion has an annular configuration, protruding radially, inwardly into said bore.

19. A link for connecting a pair of spaced members having a set of aligned holes, together, comprising:

a unitary bolt having threaded end portions and a pair of integrally formed, radially upset portions spaced inwardly relative to said threaded end portions;

a pair of nuts each having a flange, threadable on a threaded end of said shaft;

a pair of inner grommets each formed of a resilient material and having a washer insert molded therein, a bore through the body thereof and said washer, and a groove in said bore permitting said inner grommet to be snap-fit onto an upset portion of said bolt with said upset portion being received in said groove and engageable with said washer when said inner grommet is mounted on said bolt with said bolt extending through said bore; and a pair of outer grommets each formed of a resilient material and having a washer insert molded therein, a bore through the body thereof and said washer and a groove in said bore permitting said outer grommet to be snap-fit onto a flanged portion of one of said nuts.

20. A link according to claim 19 wherein the washer of each of said grommets is disposed adjacent said groove in the bore thereof.

21. A link according to claim 20 wherein each of said grommets includes a hub portion and said groove is disposed in said hub portion.

22. A link according to claim 21 wherein the washer of each of said grommets is disposed adjacent said groove in the bore thereof.

23. A link according to claim 19 wherein said grommets are formed of a urethane material.

24. A link according to claim 19 wherein the grooves of said grommets are configured to permit them to be snap-fit on either of said upset portions of said bolt and said flange portions of said nuts.

25. A link according to claim 19 wherein said upset portions of said bolt and said flange portion of said nuts have substantially the same configurations, and the grooves of said grommets are configured to permit them to be snap-fit on either of said upset portions and said flanges.

26. A link according to claim 19 wherein said inner and outer grommets are substantially similarly configured whereby they may be used interchangeably as inner or outer grommets.

27. A link for connecting a pair of spaced members together comprising:

a unitary bolt having a threaded end insertable through an opening in one of said spaced members, means disposed at an opposite end thereof connectable to the other of said spaced members and an integrally formed, radially upset portion disposed adjacent said threaded end thereof, an inner grommet formed of a resilient material, mountable on said bolt and having a portion thereof functional to snap-fit on said upset portion of said bolt when said inner grommet is mounted on said bolt, and including a washer insert molded in said inner grommet and engageable with said upset portion of said bolt when said inner grommet is mounted on said bolt;

an outer grommet formed of a resilient material, mountable on said bolt and cooperable with said inner grommet to engage said one of said spaced member therebetween when said inner grommet is mounted on said bolt, said threaded end portion of said bolt is inserted through said opening in said one of said spaced members and said outer grommet is mounted on a portion of said bolt extending through said opening; and a nut threadable on the threaded portion of said bolt, engageable with said outer grommet mounted on said bolt.

* * * * *